United States Patent [19]
Burns

[11] 3,734,110
[45] May 22, 1973

[54] PREFABRICATED STRUCTURE ADAPTED TO BE ATTACHED TO A VEHICLE TOP

[76] Inventor: Mark T. Burns, 4557 Alameda Drive, Fremont, Calif.

[22] Filed: Oct. 26, 1971

[21] Appl. No.: 192,418

[52] U.S. Cl. .................... 135/1 A, 296/10, 287/54 A
[51] Int. Cl. .............................................. E04f 1/343
[58] Field of Search ...................... 287/189.35, 54 A, 287/54 B; 224/42.1 E, 42.1 F, 42.1 H, 42.1 G, 42.1 R, 29 R, 42.45 R, 42.07, 42.43; 296/3; 135/1 A

[56] References Cited
UNITED STATES PATENTS

| | | | |
|---|---|---|---|
| 3,224,805 | 12/1965 | Clyatt | 224/29 X |
| 2,947,566 | 8/1960 | Tower | 224/29 R X |
| 3,387,727 | 6/1968 | Micheel | 214/450 |
| 3,542,407 | 11/1970 | Brown | 287/54 A |
| 2,904,360 | 9/1959 | Gamlen | 287/54 B |
| 2,284,365 | 5/1942 | Briegel | 287/54 A |
| 2,643,040 | 6/1953 | Hare | 224/42.1 E |
| 2,793,646 | 5/1957 | Lefebvre | 135/1 A |

*Primary Examiner*—Gerald M. Forlenza
*Assistant Examiner*—Jerold M. Forsberg
*Attorney*—Allen and Chromy

[57] ABSTRACT

Structures such as racks, shelters and the like which are adapted to be attached to a vehicle top are assembled with corner members which are shaped to receive and grip different lengths of pipe. These structures are also provided to the vehicle top whereby the structures are readily attached to the top of a vehicle or to the side thereof.

1 Claim, 4 Drawing Figures

PATENTED MAY 22 1973 3,734,110
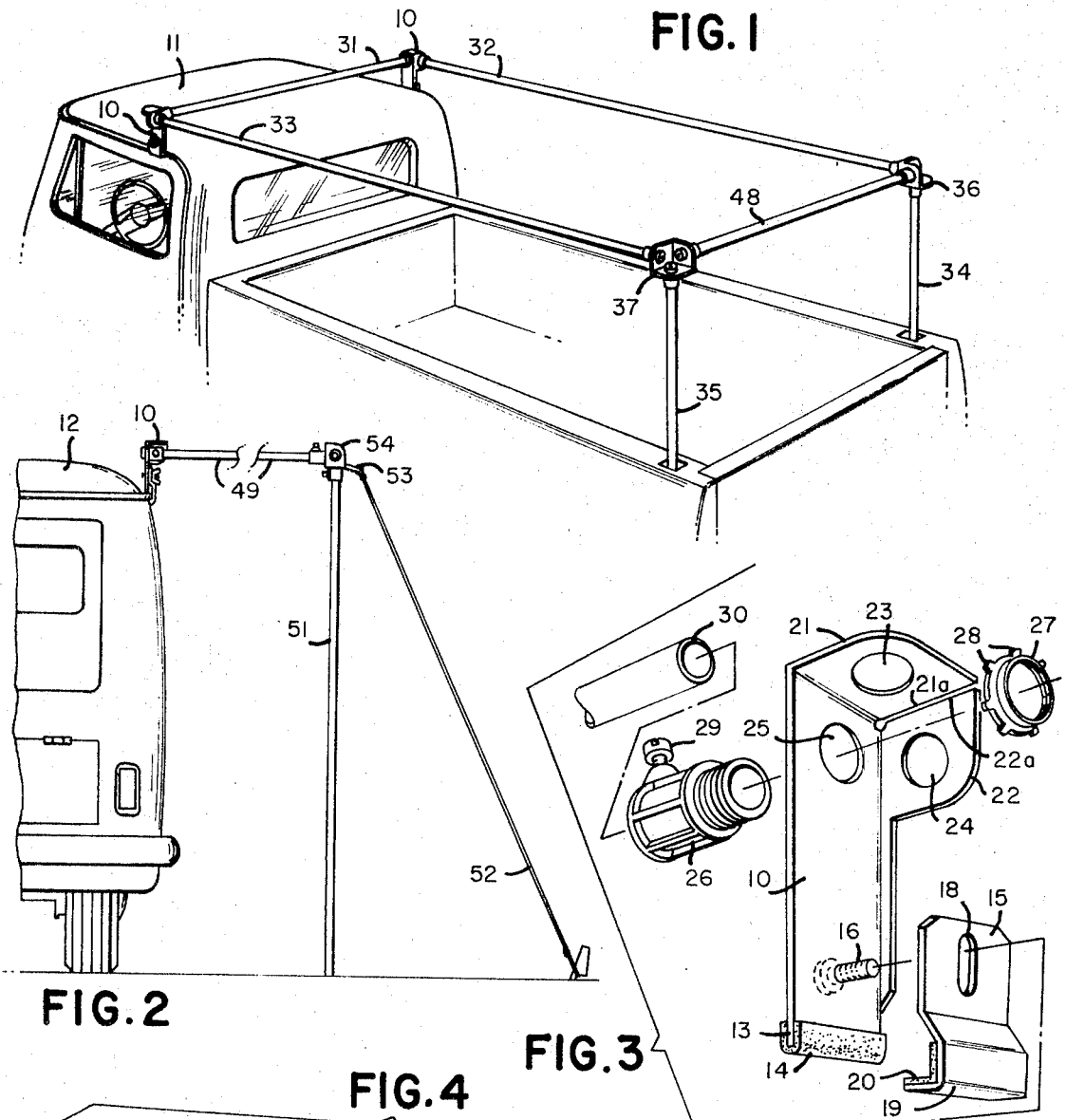
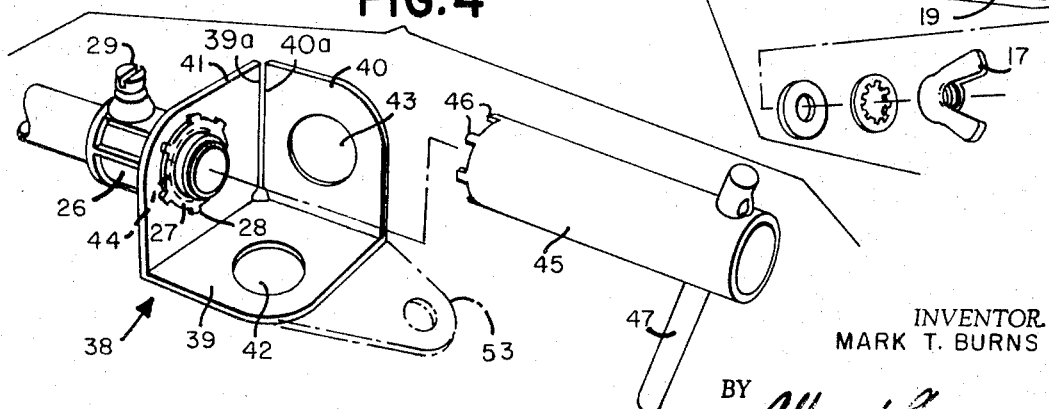
INVENTOR.
MARK T. BURNS
BY Allen and Larsen
ATTORNEYS

PREFABRICATED STRUCTURE ADAPTED TO BE ATTACHED TO A VEHICLE TOP

DESCRIPTION OF THE INVENTION

This invention relates to a prefabricated structure that is adapted for use as a rack on the top of a vehicle or as a shelter along the side thereof.

An object of this invention is to provide an improved prefabricated rack or frame that may be quickly assembled for use or disassembled after use.

Another object of this invention is to provide an improved prefabricated structure that is adapted to be attached to the gutter around the top of a motor vehicle to be used either as a rack on the top thereof or as a frame for a shelter along the side thereof.

Another object of this invention is to provide an improved prefabricated structure that employs corner fittings for receiving and gripping tubular members forming a frame for a rack or shelter.

Still another object of this invention is to provide an improved prefabricated structure employing pipes of predetermined lengths which are held together by corner members to which they are attached by fittings so that the structure may be quickly assembled for use or disassembled, stored or transported for future use.

Other and further objects of this invention will be apparent to those skilled in the art to which it relates from the following specification, claims and drawing.

In accordance with this invention there is provided a prefabricated structural arrangement that may be economically manufactured and quickly assembled for use or disassembled after use to be stored or transported for future use. This invention employs a plurality of tubular members of predetermined lengths which are adapted to be attached to and held together by three-sided corner members provided with suitable fittings. The tubular members and corner members may be made either of metal or plastic and the device is provided with means for attaching it to the gutters of a motor vehicle. This device may be assembled to function either as a rack upon the top of the vehicle or as a frame extending to the side of the vehicle to support a cloth or plastic over functioning as a shelter on the side of the vehicle.

Further details and features of this invention will be set forth in the following specification, claims and drawing, in which briefly:

FIG. 1 is a perspective view of an embodiment of this invention attached to a vehicle such as a pickup truck;

FIG. 2 is a view of another embodiment of this invention which may be used as the frame for a shelter showing the rear member of the frame attached to the roof gutter of the side of a bus-type vehicle;

FIG. 3 is an exploded view of one of the vehicle gutter gripping members and a fitting for attaching a tubular member thereto; and FIG. 4 is a detail view of one of the prefabricated corner members showing the pipe receiving and retaining fitting attached thereto and also showing a wrench for attaching this fitting to the corner member.

Referring to the drawing in detail reference numeral 10 designates an upright member shown in detail in FIG. 3 and shown attached to the gutter of the cab 11 of the pickup truck illustrated in FIG. 1 and of the top 12 of the small bus shown in FIG. 2. The bottom part 13 of the member 10 is provided with a pad 14 of plastic, rubber or the like cemented to the surfaces thereof.

The pad 14 is adapted to extend into the gutter of the vehicle top. The clamping member 15 is attached to the member 10 by the bolt 16 which is provided with a wing nut 17. The bolt 16 extends through the slot 18 provided in the clamping member 15. The bottom of the clamping member 15 is of angular shape indicated at 19 and the inner side of this angular portion is provided with a pad 20 of plastic, rubber or the like cemented thereto.

In attaching the upright member 10 to the top gutter of the vehicle the pad 14 is inserted into the inside of the gutter and the clamping member 15 is positioned on the bolt 16 so that the pad 20 thereof engages the outside and bottom of the gutter opposite the pad 14. The wing nut 17 is then drawn tightly against the clamping member 15 so that the member 10 is held erect on the vehicle.

The upper part of the upright member 10 is shaped into a three sided device including the horizontal part 21 and the side 22. Both the horizontal part 21 and the side 22 are integral with the member 10 and may be formed by bending portions of the metal to form the configuration shown. The parts 21 and 22 are provided with holes 23 and 24, respectively, for receiving the threaded portions of fittings such as the fitting 26 which is shown in FIG. 3 aligned with the hole 25. After the threaded portion of the fitting 26 is inserted into the hole 25 the nut 27 is attached thereto. This nut is provided with locking fingers 28 which engage the surfaces around the hole 25 and they also function as wrench-engaging means for tightening the nut on the threaded portion of fitting 26. The fitting 26 is also provided with a screw 29 threaded into the body thereof for the purpose of engaging the end portion of the tubular member 30 which is adapted to be inserted into the fitting 26 and held assembled therewith by the screw 29.

The upright members 10 provided to the top 11 as shown in FIG. 1 each have attached thereto the ends of two tubular members. Thus the ends of tubular members 31 and 32 are attached to the upright member on the right hand side of the cab 11 and the other end of tubular member 31 is attached to the upright member 10 on the left hand side of the cab 11. In addition this latter upright member has the far end of tubular member 33 attached thereto. The tubular members 31, 32, and 33 are attached to these uprights by fittings such as the fitting 26 shown in FIG. 3. In this case the side holes such as the holes 24 and 25 of the member illustrated in FIG. 3 are provided with these fittings.

The rear of the bed of the pickup truck shown in FIG. 1 is provided with two vertical tubular members 34 and 35, the bottom portions of tubular members 34 and 35 extend into the side rails of the pickup truck bed and the upper ends of these tubular members are attached to three sided corner members 36 and 37, respectively, which are of the type shown in FIG. 4, designated by reference numeral 38. Member 38 is provided with sides 39, 40 and 41 which have apertures 42, 43 and 44 cut therein, respectively. Each of these holes is adapted to receive the threaded portion of a fitting 26 and this fitting has a nut 27 which is attached thereto by use of the tubular wrench 45.

The tubular wrench 45 is provided with teeth 46 which are inserted between the teeth 28 of the nut. The wrench is gripped by the handle 47 and the nut 27 tightened on the fitting 26 so that the teeth 28 of the nut engage the sides around the hole in which the fitting is positioned. Thus, the ends of the pipe members 32 and 33 are held in the corner members 36 and 37, respectively, by fittings such as the fitting 26 shown in FIGS. 3 and 4. The ends of these pipes are held in these fittings by set screws such as the screw 29 provided to the fittings. Pipe member 48 which extends between the corner members 36 and 37 is also held in these members by fittings such as fitting 26 shown in FIGS. 3 and 4.

The bus shown in FIG. 2 may be provided with two upright members such as indicated at 10 for the purpose of attaching two horizontal members such as member 49 to the gutter of the vehicle. The outer end of the pipe member 49 is attached to the corner member 54 by a fitting such as the fitting 26 shown in FIG. 4. The vertical post 51 is also attached to the corner member 54 by a fitting such as that designated at 26. Thus by providing two sets of pipe members 49 and 51 to the side of the bus vehicle and attaching horizontal members (not shown) between the corner members 10 and 54 a framework for supporting a shelter cover of plastic or cloth (not shown) may be provided along the side of the vehicle. This shelter may be used by persons occupying the vehicle 12 when going on a trip such as a camping trip, for example. Additional stability may be provided to the shelter by attaching guys such as the guy 52 to the framework. For this purpose the corner members may be provided with extending tabs 53 extending therefrom or these corner members each may be provided with an additional hole to which the guy 52 is attached.

The corner parts 21 and 22 of upright member 10 are formed so that the edges 21a and 22a thereof are adjacent to each other and these edges may be welded together if desired to give the corner additional strength. Likewise, the sides 39 and 40 of corner member 38 are formed so that the sides 39a and 40a are adjacent to each other and these sides may be welded together to give the corner member additional strength.

While I have shown a preferred form of the invention, it will be understood that the invention is capable of variation and modification from the form shown so that the scope thereof should be limited only by the proper scope of the claims appended hereto.

I claim:

1. In a prefabricated shelter structure which is adapted to be readily assembled and attached to the top of a vehicle and also readily detached and disassembled for storage, said shelter being provided with a cover of cloth, plastic or the like, the combination comprising a pair of upright members of sheet metal, each of said upright members having a corner member integral with the top thereof, said corner member being formed by bending the sheet metal to have a three-sided configuration, each of the sides of said configuration having a hole formed therein, a first tubular member extending between the corner members of said upright members, means positioned in selected holes of said last mentioned corner members detachably attaching said tubular member to said last mentioned corner members, additional tubular members, means positioned in other selected holes of said last mentioned corner members detachably attaching said additional tubular members to the corner members of said upright members and extending therefrom at predetermined angles with respect to said first tubular member, a second tubular member, a pair of corner elements, said corner elements each being formed of sheet metal bent into a three sided configuration with each side having a hole formed therein, means attaching one end of said second tubular element to a hole in a side one of said pair of corner elements and means attaching the other end of said second tubular element to a hole in a side of the other of said pair of corner elements, means attaching one of said additional tubular members to a hole in a second side of said one of said corner elements and means attaching another one of said additional tubular members to a hole in a second side of said other of said corner elements, a pair of vertical members, means attaching one of said pair of vertical members to a hole in a third side of said one of said corner elements and means attaching the other of said vertical members to a hole in a third side of the other of said corner elements, said upright members and said vertical members supporting all of said tubular members in substantially horizontal positions and a cover attached to said tubular members to form a shelter thereunder.

* * * * *